United States Patent
Brosz et al.

(10) Patent No.: US 8,443,923 B2
(45) Date of Patent: May 21, 2013

(54) VIBRATION ISOLATOR DEVICE

(75) Inventors: Christopher Brosz, West Fargo, ND (US); Logan C. Miller, Clifford, ND (US); Mark Allan Renard, Page, ND (US)

(73) Assignee: CNH America LLC, New Holland, PA (US)

( * ) Notice: Subject to any disclaimer, the term of this patent is extended or adjusted under 35 U.S.C. 154(b) by 42 days.

(21) Appl. No.: 13/050,524

(22) Filed: Mar. 17, 2011

(65) Prior Publication Data

US 2012/0234618 A1  Sep. 20, 2012

(51) Int. Cl.
*B62D 24/02* (2006.01)
*B62D 27/04* (2006.01)

(52) U.S. Cl.
USPC ......... 180/89.1; 180/900; 296/191; 296/35.1; 296/29; 403/220

(58) Field of Classification Search
USPC ............... 180/89.12, 89.1, 900; 296/191, 36, 296/35.1, 190.07, 187.01, 190.01, 29, 193.05; 403/220, 221, 222, 223, 224, 225, 226, 227, 403/228; 52/167.8, 167.7
IPC .......... B62D 24/02,24/04, 27/04, 33/08, 33/10, B62D 33/077, 39/00, 49/00
See application file for complete search history.

(56) References Cited

U.S. PATENT DOCUMENTS

| | | | |
|---|---|---|---|
| 2,838,339 A | 6/1958 | Schaldenbrand | |
| 3,525,548 A | 8/1970 | Mutka | |
| 3,656,799 A | 4/1972 | Malm et al. | |
| 4,352,521 A | 10/1982 | Trenkler | |
| 4,573,733 A | 3/1986 | Zaydel | |
| 4,973,102 A | 11/1990 | Bien | |
| 5,429,412 A | 7/1995 | Schoen et al. | |
| 6,712,655 B1 * | 3/2004 | Schlemmer et al. | 440/111 |
| 7,416,244 B2 | 8/2008 | Polk et al. | |
| 7,523,980 B2 | 4/2009 | Okamoto et al. | |
| 7,686,385 B2 | 3/2010 | Dolan et al. | |
| 2008/0136207 A1 | 6/2008 | Aoyama et al. | |
| 2011/0024213 A1 | 2/2011 | Giovannini et al. | |

FOREIGN PATENT DOCUMENTS

JP          7174191 A    7/1995

* cited by examiner

*Primary Examiner* — Paul N Dickson
*Assistant Examiner* — Keith Frisby
(74) *Attorney, Agent, or Firm* — Patrick M. Sheldrake

(57) ABSTRACT

A vibration isolator device securing a nonmetal panel to a metal frame of a work vehicle includes a metal member affixed to a surface of the nonmetal panel, the metal member facing the metal frame. An isolator mount plate is secured to the frame in a manner permitting a predetermined adjustment between the isolator mount plate and the frame in each of two directions. A vibration isolator is positioned between the metal member and the frame. A region of the isolator mount plate is configured to receive and maintain vibration isolation between the region of the isolator mount plate and the metal member, the region of the isolator mount plate providing a predetermined adjustment between the isolator mount plate and the metal member in a third direction.

20 Claims, 6 Drawing Sheets

VIBRATION ISOLATOR DEVICE

FIELD OF THE INVENTION

The present invention relates generally to the field of work vehicles. It relates more particularly to work vehicles having nonmetal panels secured to metal frame or metal substructure supporting the nonmetal panels.

BACKGROUND OF THE INVENTION

Work vehicles, such as wheel loaders, include an implement with which to perform work during operation of the work vehicle. The implement is typically located at one end of the work vehicle. Large covers or hoods are typically used to enclose the motor of the work vehicle, and are positioned at the opposite end of the work vehicle. In order to decrease weight of the covers or hoods, nonmetal panels may overlay the metal frame or metal substructure supporting the covers or hoods.

However, rigidly mounting nonmetal panels to a metal frame or substructure can present problems. For example, vibration generated during operation of the work vehicle may result in cracking and weakening of the nonmetal panel. In addition, forces applied to the assembled cover or hood structure may also induce stress in the nonmetal panels, similarly resulting in cracking and weakening of the nonmetal panel. Further problems may be associated with the necessary adjustment required to align nonmetal panels with the remaining metal frame or substructure to compensate for tolerance "stack-up".

Accordingly, it would be advantageous to provide a vibration isolator device providing vibration isolation between a metal frame or substructure and the nonmetal panel that is easy to assemble and provides adjustment in at least three directions.

SUMMARY OF THE INVENTION

The present invention further relates to a vibration isolator device securing a nonmetal panel to a metal frame of a work vehicle including a metal member affixed to a surface of the nonmetal panel, the metal member facing the metal frame. An isolator mount plate is secured to the frame in a manner permitting a predetermined adjustment between the isolator mount plate and the frame in at least two directions. A vibration isolator is positioned between the metal member and the frame. A region of the isolator mount plate is configured to receive and maintain vibration isolation between the region of the isolator mount plate and the metal member, the region of the isolator mount plate providing a predetermined adjustment between the isolator mount plate and the metal member in a third direction.

The present invention further relates to a work vehicle including a motor associated with selectable movement of a frame by operator controls, the frame structurally carrying a cab structure. A vibration isolator device securing a nonmetal panel to a metal frame of a work vehicle includes a metal member affixed to a surface of the nonmetal panel, the metal member facing the metal frame. An isolator mount plate is secured to the frame in a manner permitting a predetermined adjustment between the isolator mount plate and the frame in at least two directions. A vibration isolator is positioned between the metal member and the frame. A region of the isolator mount plate is configured to receive the vibration isolator and maintain vibration isolation between the region of the isolator mount plate and the metal member, the region of the isolator mount plate providing a predetermined adjustment between the isolator mount plate and the metal member in a third direction.

An advantage of the present invention is a vibration isolator device that provides vibration isolation between a metal substructure and a nonmetal panel that is easy to assemble and provides adjustment in multiple directions.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
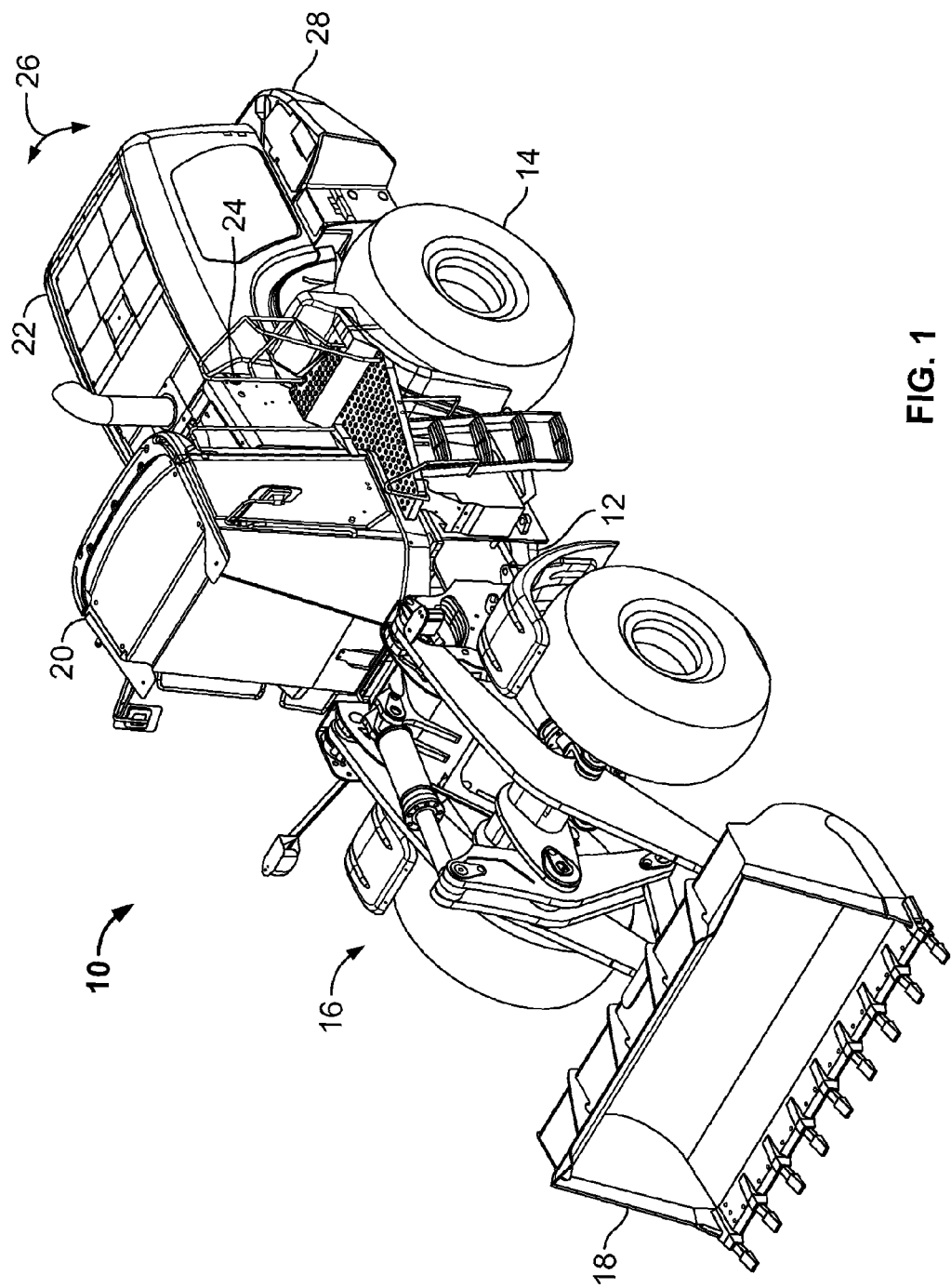
FIG. 1 is an elevation view of an embodiment of a work vehicle.

FIG. 1 shows a work vehicle 10 provided with a frame 12 that rotatably carries a plurality of wheels 14. Alternately, a track drive or other appropriate drive system to movably drive the frame may be used. A manipulating structure 16 includes an arrangement of structural members and actuators controllable by an operator (not shown) located within a cab structure 20 to manipulate an implement 18 to perform work. Frame 12 structurally supports cab structure 20 to surround and protect the operator. Located opposite implement 18 is a motor (not shown) that is surrounded by a housing or hood 22 that surrounds the motor when the hood is in a retracted position. Due to the enlarged hood's size and weight, in one embodiment, a hood opening device (not shown) may be operated by an electric motor. However, in other embodiments, springs or other types of devices, such as hydraulic, mechanical, pneumatic or combination thereof may be used. In combination with a pair of opposed pivots 24 and the hood opening device, hood 22 may be urged into a rotational movement 26. As further shown in FIG. 1, hood 22 is in a retracted position, resting on frame 12 which extends to a member such as a counterweight 28.

Figure 2:
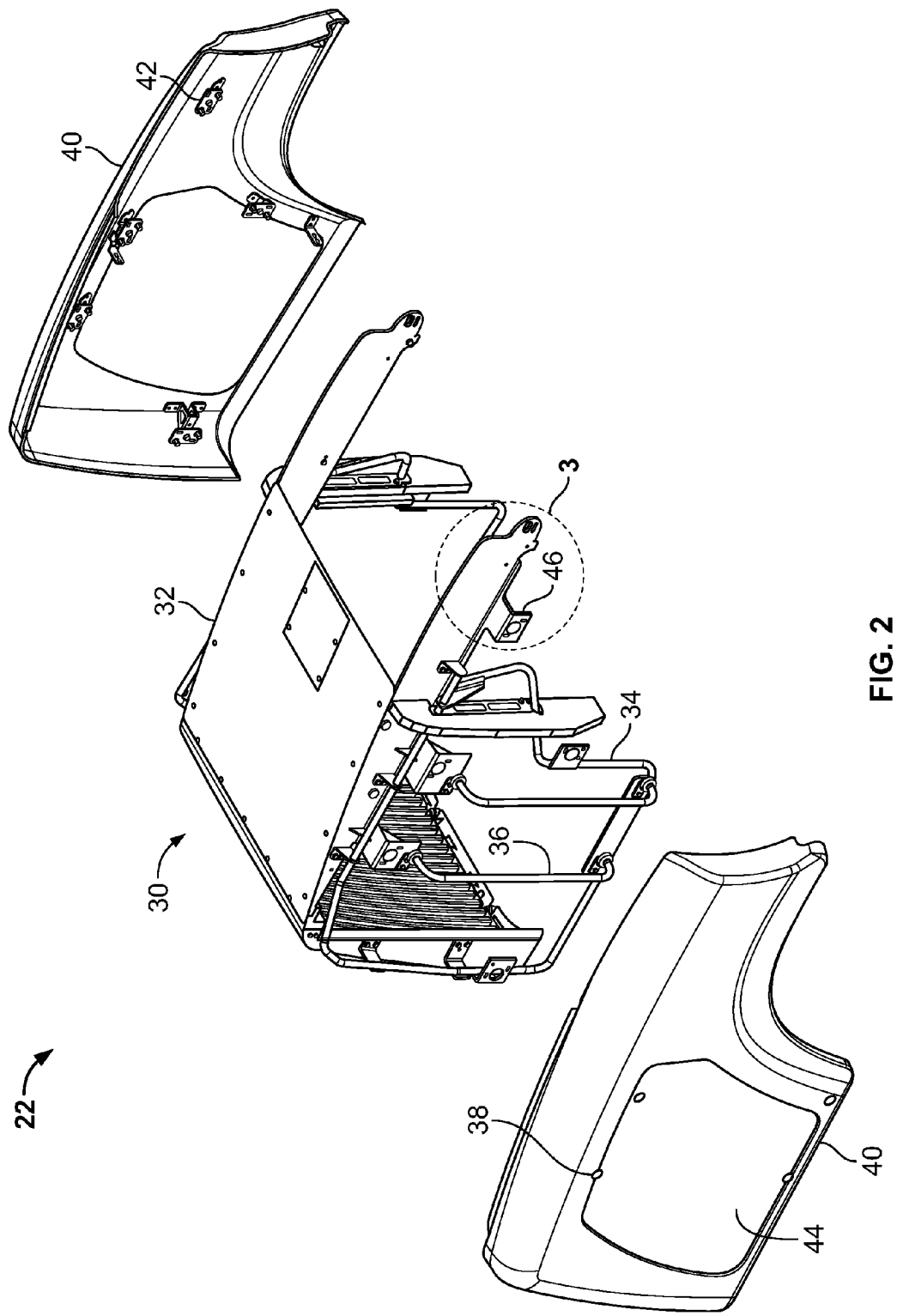
FIG. 2 is a top perspective exploded view of the hood of the work vehicle of FIG. 1.

FIG. 2 shows a top perspective exploded view of hood 22, including a metal substructure or metal frame 30. Metal frame 30 further includes an upper hood weldment 32, as well as substantially vertically directed tube structure 34 that is secured, such as by fasteners to provide structural strength and stability to the hood. In another embodiment, a tube structure may extend in a non-vertical direction. As further shown FIG. 2, handles 36 extend outwardly from openings 38 formed in nonmetal panel 40, which nonmetal panel including screen 44. In one embodiment, nonmetal panel 40, such as fiberglass or other suitable material having requisite strength, durability and lightweight properties. As further shown in region 3 of FIG. 2, a tab 46 extends from upper hood weldment 32 and corresponds to a vibration isolator subassembly 42 associated with nonmetal panel 40. In the exemplary embodiment shown in FIG. 2, there are five (5) corresponding tabs and vibration isolator subassemblies that are assembled together to secure the nonmetal panels 40 to the metal frame 30. However, in other embodiments, different numbers of corresponding tabs and vibration isolator subassemblies may be utilized.

Figure 3:
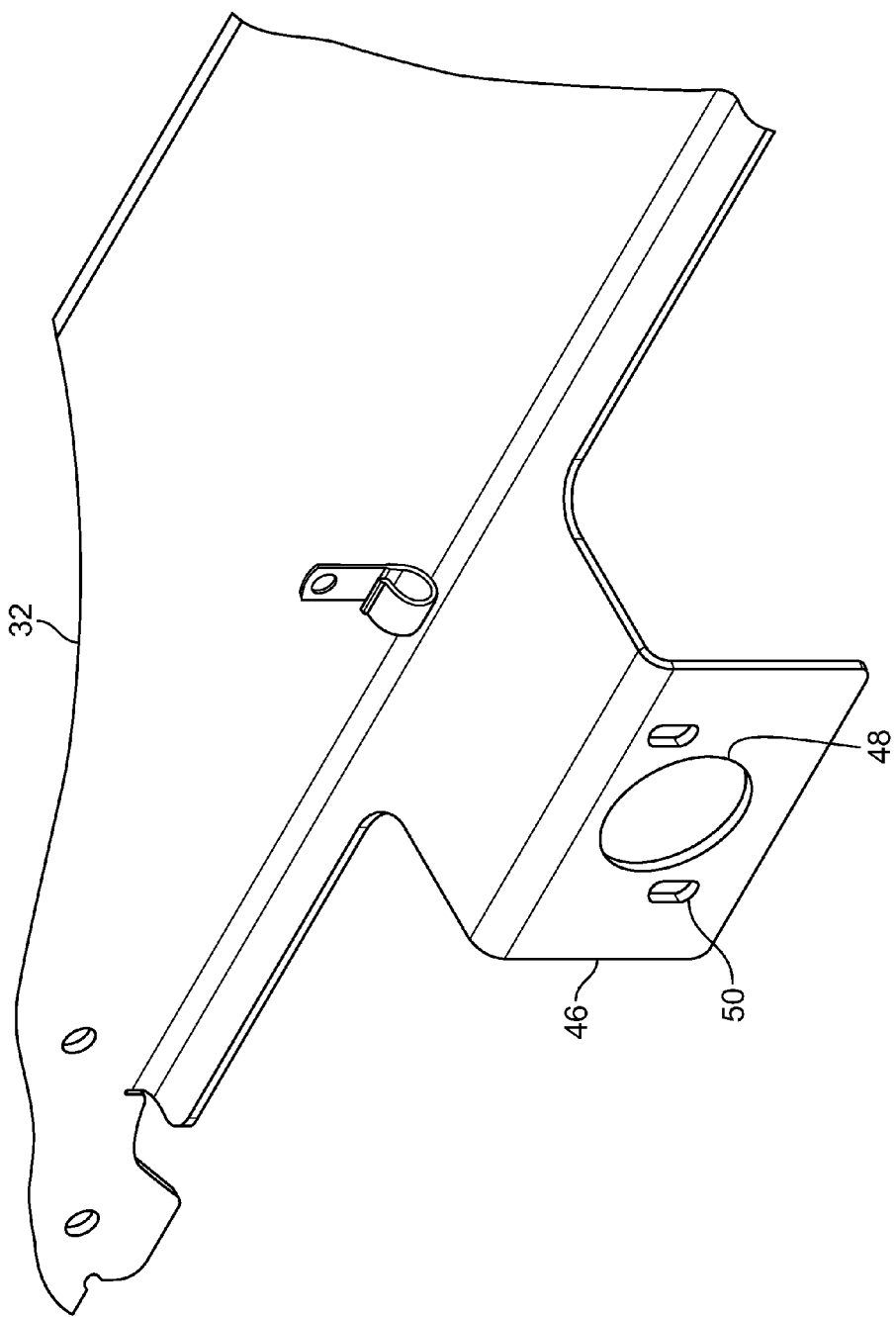
FIG. 3 is a partial top perspective view of metal side structure taken from region 3 of FIG. 2.

FIG. 3 shows an enlarged partial top perspective view of upper metal side structure of hood weldment 32, including tab 46. Tab 46 further includes an opening 48 that is sufficiently large to permit relative movement of a fastener securing an isolator mount plate 52 (FIG. 4) with respect to tab 46 of the upper hood weldment. As further shown FIG. 3, slotted apertures 50 are positioned at diametrically opposed locations with respect to tab 46. In another embodiment, the slotted apertures may be positioned in different locations. As further shown in FIG. 3, the orientation of slotted apertures 50 are directed in a substantially vertical direction, although in another embodiment the orientation of the slotted apertures could be directed in a substantially horizontal direction or another direction. Slotted apertures 50 are configured to adjustably receive fasteners to permit relative movement of the isolator mount plate 52 in two different directions with respect to tab 46 of upper hood weldment 32 to facilitate alignment therebetween, and may further permit relative movement in a third direction, depending upon fastener arrangements, which will be discussed in further detail below.

Figure 4:
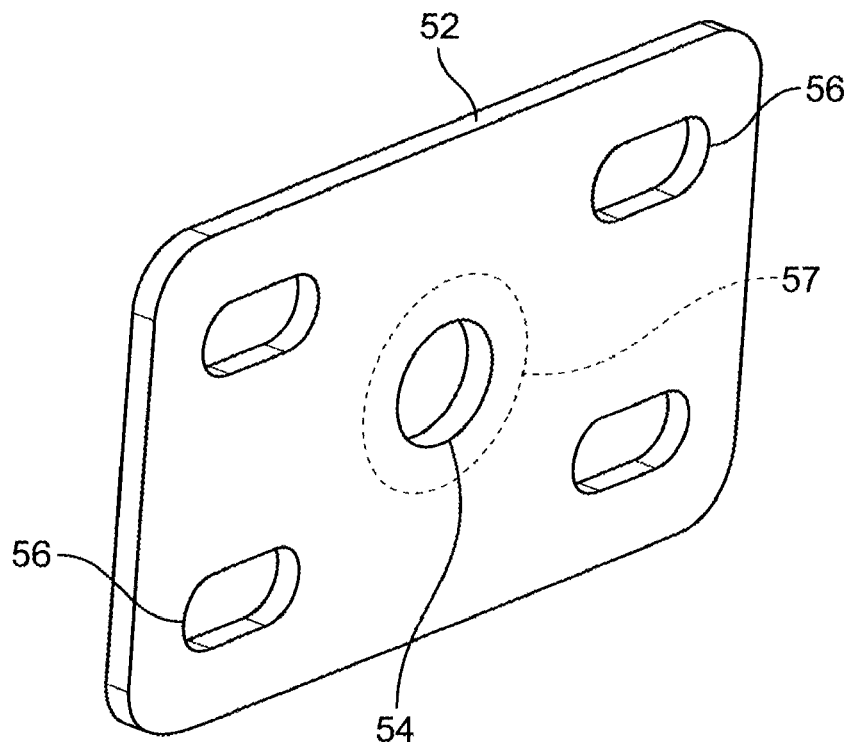
FIG. 4 is a top perspective view of an exemplary embodiment of an isolator mount plate.

FIG. 4 shows a top perspective view of isolator mount plate 52, including an opening 54 configured to receive a fastener in a vibrationally isolated manner. As further shown in FIG. 4, isolator mount plate 52 has substantially planar opposed surfaces. In another embodiment, isolator mount plate 52 may include non-planar opposed surfaces. Isolator mount plate 52 further includes a region 57 that may be manifested as a protrusion and/or a recess with respect to a surface of the isolator mount plate. That is, region 57 may include a protrusion from each of the opposed surfaces, a recess with respect to each of the opposed surfaces or a combination thereof. However, in a further embodiment, region 57 may be flush with one or both of the surfaces of the isolator mount plate. In addition, in one embodiment, the magnitude of the protrusion/recess of region 57 may be different from each other. In yet another embodiment, region 57 has a unitary construction with respect to isolator mount plate 52. However, in another embodiment, region or spacer 157 (FIG. 7) is a component separate from isolator mount plate 52, such as a washer or spacer separate from the isolator mount plate, and may be moved to contact one of either of the opposed surfaces of the isolator mount plate. In addition, isolator mount plate 52 includes a plurality of slotted apertures 56, such as slotted apertures directed horizontally, that permits selected adjustment with respect to corresponding slotted aperture 50 formed in tab 46 of upper hood weldment of metal frame 30.

Figure 5:
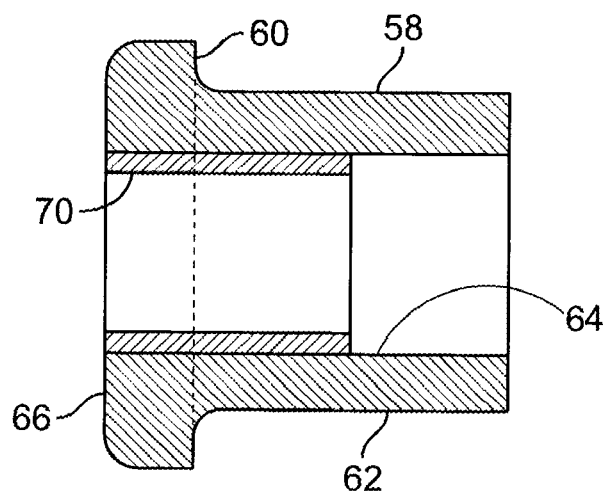
FIG. 5 is a cross section of an exemplary embodiment of a vibration isolator.

FIG. 5 shows a cross section of a vibration isolator 58 that includes a head 60 having an increased cross sectional area, extending to a barrel portion or barrel 62 that is of substantially uniform cross sectional area. In one embodiment, vibration isolator 58 is composed of a rubber material, although in other embodiments, the vibration isolator may be composed of a suitable resilient material. Vibration isolator 58 includes a channel 64 extending through each of opposed ends 66, 68. Channel 64 is configured to receive a sleeve 70 having a longitudinal length that is less than the distance between opposed ends 66, 68 of vibration isolator 58 so the sleeve is not deformed during installation. As further shown FIG. 5, end 68 has a substantially uniform cross section with respect to barrel 62, although in another embodiment, end 68 may have an increased cross sectional area resembling that of head 60, so long as end 68 is small enough to be assembled through opening 54 of isolator mount plate 52. Vibration isolator 58 is configured to vibrationally isolate metal frame 30 from nonmetal panel 40 as assembled with the vibration isolator subassembly 42.

Figure 6:
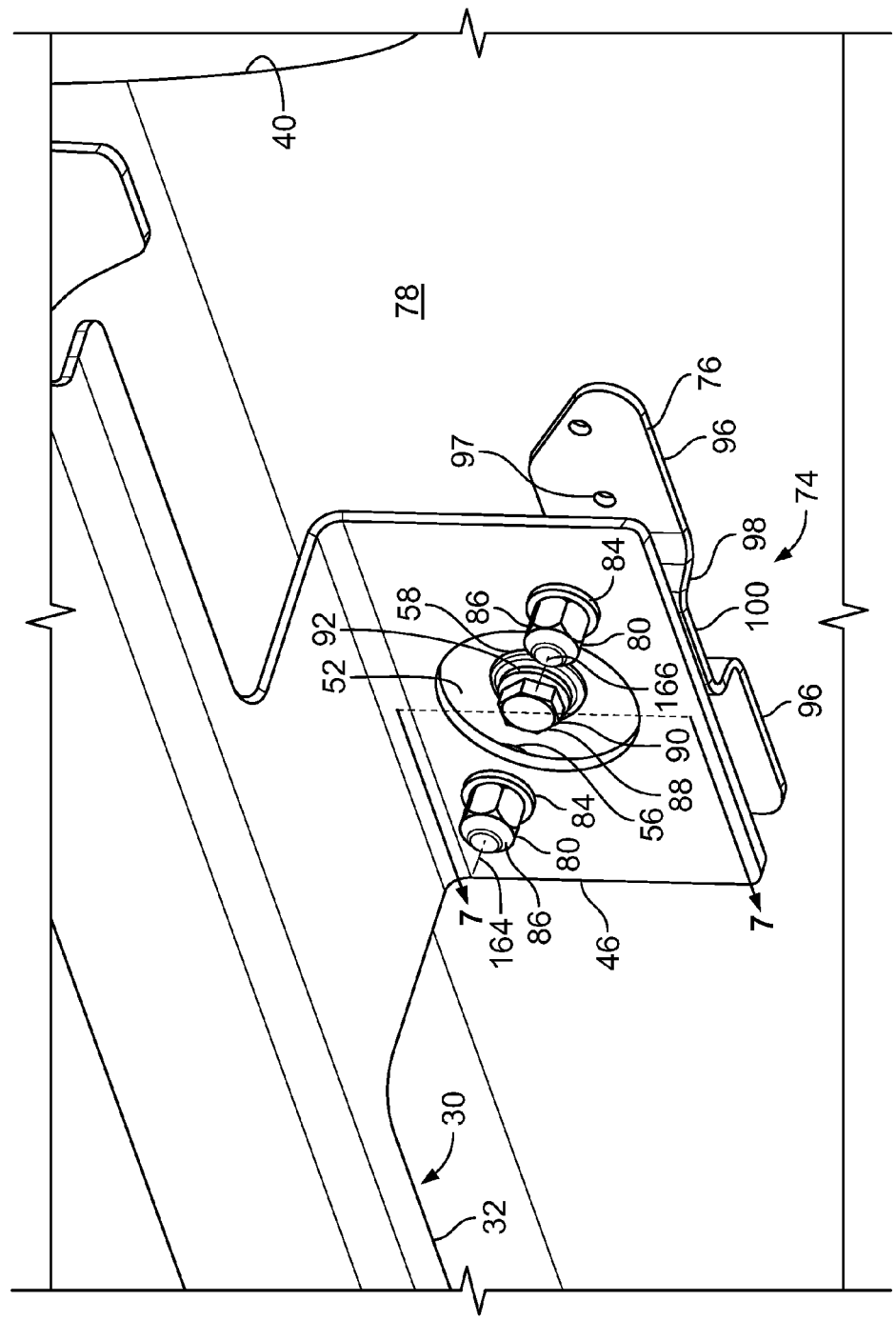
FIG. 6 is a bottom perspective view of a metal side structure assembled to a nonmetal panel.

FIG. 6 shows a bottom perspective view of an assembled metal side structure, such as tab 46 assembled to a nonmetal panel 40. Nonmetal panel 40 includes and is secured to a metal member 76, such as a bracket, having a pair of opposed flanges 96 separated by a pair of risers 98 extending outwardly and away from a surface 78 of nonmetal panel 40 that faces tab 46. A raised portion 100 is positioned between and connects the pair of risers 98, providing spacing or separation between the raised portion and surface 78 of the nonmetal panel 40. As further shown in FIG. 6, metal member 76 resembles a "hat section" as is well known in the art, although other shapes may also be used. In one embodiment, a combination of resin and fiberglass cloth (not shown) may be applied to flange 96 and apertures 97 formed in the flange to secure (bond) the flanges to surface 78 of nonmetal panel 40, and a process sometimes referred to as "glassing". In another embodiment, metal member 76 may be secured to surface 78 of nonmetal panel 40 by fasteners, adhesives or other suitable techniques.

Figure 7:
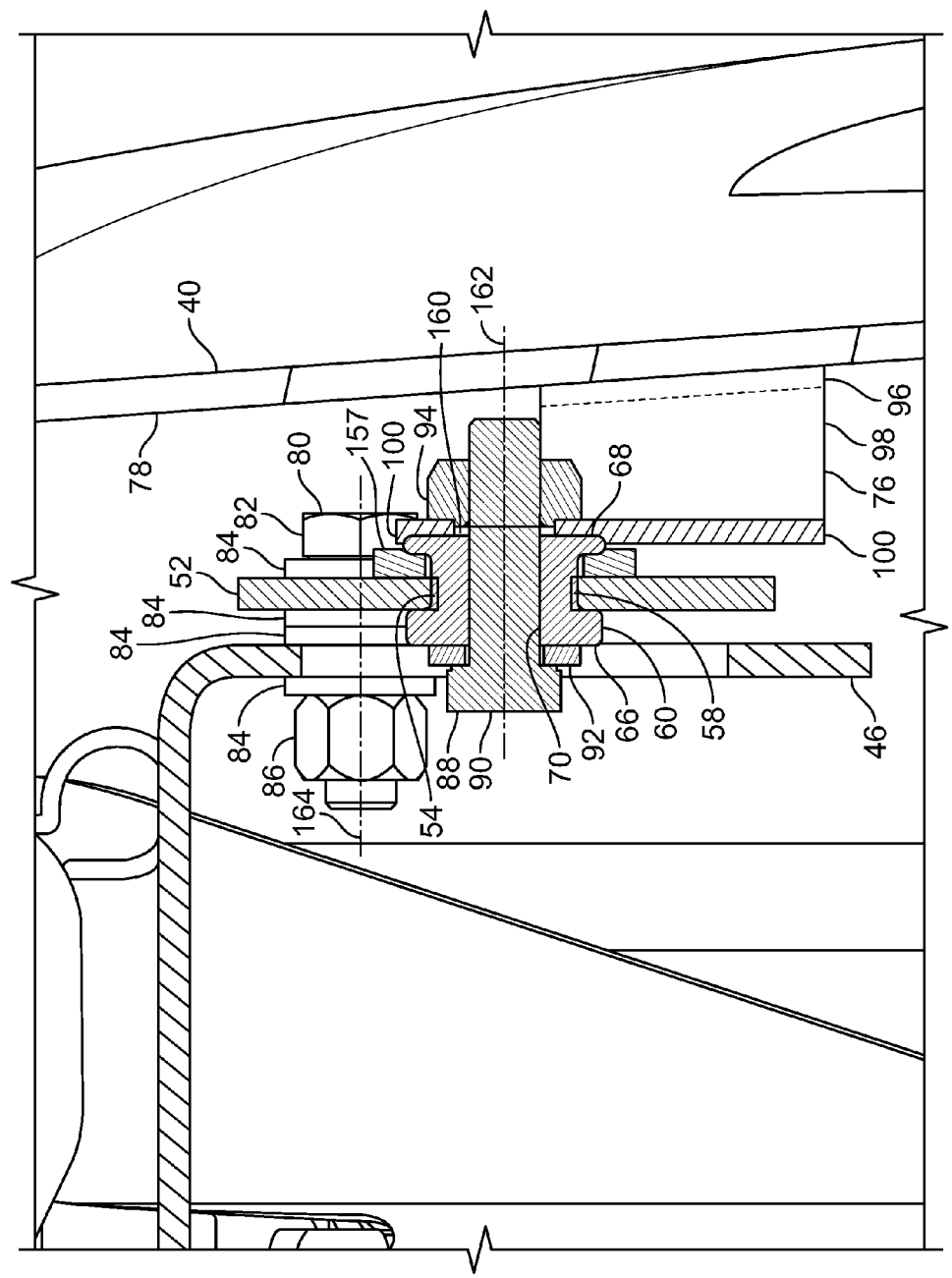
FIG. 7 is a cross section taken along line 7-7 of FIG. 6 of a metal side structure assembled to a nonmetal panel.

FIGS. 6 and 7 show an assembled metal side structure, such as tab 46 assembled to a nonmetal panel 40 using a vibration isolation device 74. Fasteners 80, which may include in an exemplary embodiment, a bolt 82, washers 84 and a nut 86, secure isolator mount plate 52 to tab 46. As further shown, a pair of washers 84 are positioned between isolator mount plate 52 and tab 46, providing a technique for controlling the distance therebetween in a third direction that is substantially perpendicular to surface 78 of nonmetal panel 40. In addition, or alternately, region 57 (FIG. 4) or region or spacer 157 of isolator mount plate 52, as previously discussed, may be utilized to control the distance between tab 46 and nonmetal panel 40 by permitting selective control of the distance between isolator mount plate 52 and raised portion 100 of metal member 76 that is secured to surface 78 of nonmetal panel 40.

In order to vibrationally isolate isolator mount plate 52 from metal member 76, a fastener 88 such as a bolt 90, a washer 92 and a nut 94 is used in combination with vibration isolator 58. That is, as further shown FIG. 7, washer 92 is installed onto bolt 90, followed by the installation of vibration isolator 58, which is performed by directing end 66 of the vibration isolator onto bolt 90. The end of bolt 90 is directed through opening 54 formed in isolator mount plate 52 and through a corresponding opening 160 formed in spacer 157, through an opening formed in raised portion 100 of metal member 76, and threadedly engaging the threads of bolt 90 and the threads of nut 94. In one embodiment nut 94 is a weld nut, i.e., welded to a surface of raised portion 100 facing surface 78 of nonmetal panel 40. Upon the sufficient further threaded engagement between bolt 90 and nut 94, the distance of the shank of bolt 90 between the head of the bolt and the nut is less than the uncompressed longitudinal length of vibration isolator 58, resulting in the application of a compressive force to the opposed ends 66, 68 of the vibration isolator. In response to the compressive force, a portion of barrel 62 adjacent to end 68 of vibration isolator 58 abuts the corresponding facing surface of raised portion 100 and is urged radially outward and also into abutting contact with a surface of spacer 157 facing surface 78 of the nonmetal panel 40, increasing the cross sectional area of the barrel 62 adjacent to end 68. Simultaneously, head 60 of vibration isolator 58 is urged radially outward and into compressive abutting contact between a surface of isolator mount plate 52 facing away from surface 78 of nonmetal panel 40 and a surface of washer 92 facing surface 78. In other words, head 60 and end 68 of vibration isolator 58 are urged toward each other to compressively receive and vibrationally isolate isolator mount plate 52 and spacer 157 between each other.

Stated another way, vibration isolator 58 isolates vibration between a region 57 (or spacer 157 as shown in FIG. 7) of isolator mount plate 52, although which region may or may not include spacer 157, but simultaneously provides selective control in a third direction along the axis 162 of fastener 88. In addition, fasteners 80 may also provide selective control in a third direction along the axes 164, 166 of fasteners 80. While the selective control in the third direction along the axes 164, 166 of fasteners 80 may both be parallel to axis 162 of fastener 88, if desired, such as the use of an unequal number of washers 84 positioned between tab 46 and isolator mount plate 52, fasteners 80 may alter the directions of axes 164, 166, resulting in selective control of axes 164, 166 in a direction that is different from the direction of axis 162 of fastener 88. Further, by virtue of slotted apertures 50, 56 formed in respective tab 46 and isolator mount plate 52 and axes 164, 166 of fasteners 80 being parallel with axis 162 of fastener 88, selective positional control and adjustment is permitted in two directions prior to securing fasteners 80 in position. That is, the vibration isolator device of the present disclosure provides for alignment in at least three directions which both reduces vibration and permits selective control of the alignment between the metal frame and the nonmetal panel. Each of vibration reduction and improved alignment capabilities help to reduce stress subjected to the nonmetal panel, resulting in an increase of the useful service life of the nonmetal panel in the work vehicle.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vibration isolator device securing a nonmetal panel to a metal frame of a work vehicle comprising:
   a metal member affixed to a surface of the nonmetal panel, the metal member facing the metal frame;
      an isolator mount plate secured to the frame in a manner permitting a predetermined adjustment between the isolator mount plate and the frame in at least two directions;
      a vibration isolator positioned between the metal member and the frame;
      wherein a region of the isolator mount plate is configured to receive and maintain vibration isolation between the region of the isolator mount plate and the metal member, the region of the isolator mount plate providing a predetermined adjustment between the isolator mount plate and the metal member in a third direction.

2. The device of claim 1, wherein the isolator mount plate includes an opening to receive the vibration isolator and an aperture to receive a fastener to secure the metal frame to the isolator mount plate.

3. The device of claim 2, wherein the aperture of the isolator mount plate is slotted.

4. The device of claim 3, wherein the slotted aperture of the isolator mount plate is oriented at an angle to a corresponding slotted aperture formed in the metal frame.

5. The device of claim 4, wherein the vibration isolator includes a channel formed through opposed ends of the vibration isolator to receive a fastener securing the isolator mount plate to the metal member.

6. The device of claim 5, wherein one of the opposed ends of the vibration isolator has an enlarged cross sectional area.

7. The device of claim 6, wherein the vibration isolator includes a sleeve extending partially through the channel.

8. The device of claim 7, wherein upon installation, the opposed ends of the vibration isolator abut corresponding opposed surfaces of the region of the isolator mount plate, applying a compressive abutting force to the corresponding opposed surfaces of the region of the isolator mount plate.

9. The device of claim 1, wherein the region of the isolator mount plate and the isolator mount plate have a unitary construction.

10. The device of claim 1, wherein the region of the isolator mount plate includes a spacer that is separable from the isolator mount plate.

11. The device of claim 10, wherein the spacer is selectably positionable to either of the opposed surfaces of the isolator mount plate.

12. A work vehicle comprising:
   a motor associated with selectable movement of a frame by operator controls;
   the frame structurally carrying a cab structure;
      a vibration isolator device securing a nonmetal panel to a metal frame of a work vehicle comprising:
      a metal member affixed to a surface of the nonmetal panel, the metal member facing the metal frame;
      an isolator mount plate secured to the frame in a manner permitting a predetermined adjustment between the isolator mount plate and the frame in at least two directions;
      a vibration isolator positioned between the metal member and the frame;
      wherein a region of the isolator mount plate is configured to receive the vibration isolator and maintain vibration isolation between the region of the isolator mount plate and the metal member, the region of the isolator mount plate providing a predetermined adjustment between the isolator mount plate and the metal member in a third direction.

13. The work vehicle of claim 12, wherein the isolator mount plate includes an opening to receive the vibration isolator and an aperture to receive a fastener to secure the metal member to the isolator mount plate.

14. The device of claim 13, wherein the aperture of the isolator mount plate is slotted.

15. The device of claim 14, wherein the slotted aperture of the isolator mount plate is oriented at an angle to a corresponding slotted aperture formed in the metal frame.

16. The device of claim 15, wherein the vibration isolator includes a channel formed through opposed ends of the vibration isolator to receive a fastener securing the isolator mount plate to the metal member.

17. The device of claim 16, wherein one of the opposed ends of the vibration isolator has an enlarged cross sectional area.

18. The device of claim 17, wherein the vibration isolator includes a sleeve extending partially through the channel.

19. The device of claim 18, wherein upon installation, the opposed ends of the vibration isolator abut corresponding surfaces of the region of the isolator mount plate, applying a compressive abutting force to the corresponding facing surfaces of the region of the isolator mount plate.

20. The device of claim 12, wherein the region of the isolator mount plate includes a spacer that is separable from the isolator mount plate, and is selectably positionable to either of the opposed surfaces of the isolator mount plate.

* * * * *